United States Patent
Powell et al.

[19]

[11] Patent Number: 6,152,045
[45] Date of Patent: Nov. 28, 2000

[54] MAGNETIC LEVITATION SYSTEM FOR LONG DISTANCE DELIVERY OF WATER

[76] Inventors: James R. Powell, P.O. Box 547, Shoreham, N.Y. 11786; Gordon T. Danby, P.O. Box 12, Wading River, N.Y. 11792

[21] Appl. No.: 09/122,029

[22] Filed: Jul. 24, 1998

[51] Int. Cl.⁷ .................................................. B61B 13/00
[52] U.S. Cl. ........................ 104/281; 104/286; 105/360
[58] Field of Search .................................. 104/281, 282, 104/284, 286; 105/355, 358, 359, 360, 423

[56] References Cited

U.S. PATENT DOCUMENTS

| | | | |
|---|---|---|---|
| 3,250,742 | 5/1966 | Nalpas | 105/358 |
| 3,470,828 | 10/1969 | Powell, Jr. et al. | |
| 3,845,720 | 11/1974 | Bohn et al. | |
| 3,994,236 | 11/1976 | Düll et al. | |
| 4,123,976 | 11/1978 | Nakamura et al. | |
| 4,259,908 | 4/1981 | Feistkorn et al. | |
| 4,280,412 | 7/1981 | Mihirogi | |
| 4,516,505 | 5/1985 | Heidelberg | |
| 4,641,586 | 2/1987 | Miller et al. | |
| 4,646,651 | 3/1987 | Yamamura et al. | |
| 4,731,569 | 3/1988 | Bohn | |
| 4,866,380 | 9/1989 | Meins et al. | |
| 4,972,779 | 11/1990 | Morishita et al. | |
| 5,067,415 | 11/1991 | Morishita et al. | |
| 5,094,173 | 3/1992 | Tada et al. | |
| 5,146,853 | 9/1992 | Suppes | |
| 5,178,072 | 1/1993 | Suzuki | |
| 5,184,557 | 2/1993 | Rossing | |
| 5,189,961 | 3/1993 | Fujie | 104/281 |
| 5,213,047 | 5/1993 | Fujiwara et al. | 104/281 |
| 5,287,026 | 2/1994 | Ogihara et al. | 104/281 |
| 5,865,123 | 2/1999 | Powell et al. | 104/281 |

FOREIGN PATENT DOCUMENTS

| | | |
|---|---|---|
| 39 25 333 | 2/1991 | Germany. |
| 42 13 087 | 8/1993 | Germany. |
| 1 426 580 | 3/1976 | United Kingdom. |

OTHER PUBLICATIONS

Copy of the International Search Report Relating to PCT/US99/15779 Dated Oct. 18, 1999.
Thomas D. Rossing, et al., "Magnetic Levitation", The Physics Teacher, Dec. 1991.

*Primary Examiner*—Mark T. Le
*Attorney, Agent, or Firm*—Fulwider Patton Lee & Utecht, LLP

[57] ABSTRACT

The magnetic levitation system for long distance delivery of water includes a magnetic levitation guideway and a magnetic levitation train of vehicles for carrying large amounts of water at high speed. Vehicles of the water train have a large, flexible balloon having a thick skin formed of reinforced flexible composite material for carrying water. When pressurized and filled with water, the container forms a streamlined cylinder that runs the full length of the vehicle. After delivery of the water load and depressurization, the flexible skins are depressurized and collapsed to minimize the frontal area and air drag on the vehicles. An "iron lift" guideway panel provides the magnetic lift force, with superconducting magnets on the vehicle attracted upwards to laminated steel plates attached to the guideway. Null flux aluminum loops provided for inherent stabilization. Unstable horizontal attractive forces are countered by null flux stability loop circuits making the stable restoring force from the null flux loops greater than the unstable force from the attraction to the steel plates, so that the net horizontal force is restoring, and the suspension is horizontally stable.

6 Claims, 8 Drawing Sheets

MAGNETIC LEVITATION SYSTEM FOR LONG DISTANCE DELIVERY OF WATER

BACKGROUND OF THE INVENTION

1. Field of the Invention

This invention relates generally to a magnetic levitation vehicle system, and more particularly concerns a system for long distance transportation of water by a maglev vehicle such as a maglev train.

2. Description of Related Art

The availability of ample clean water is a major present concern in many regions of the world, and is expected to become an ever greater problem in the decades ahead—in fact, many experts believe it to be the number one problem facing the world. According to a recent U.S. report, a large fraction of the world's population, most of them poor, already lives in a state of water scarcity.

World population is expected to grow to 8.3 billion (mid-range projection) by 2025 AD. This growth, along with increasing industrialization, urbanization and irrigation, will put even more stress on water resources. Many locations in the Western United States are also significantly over-drawing the ground water—in effect, "mining" it, since the aquifer replenishment time is very long. In the Ogalla ("High Plains") aquifer, for example, the water table has already dropped over 100 feet in many locations, due to ground water withdrawals for agriculture. Much of the nation's food comes from this region. Similar overdraft problems are found in California's San Joaquin Valley, Arizona, Nevada, and elsewhere. As the water table drops, ground subsidence often occurs, resulting in damage to structures, cracks, etc. In some locations, ground subsidence of several meters has taken place.

Water demand in the Middle East is even greater than in the Western US, totaling about 200,000 megagallons daily for the countries of Egypt, Iraq, Israel, Jordan, Lebanon, Libya, Oman, Saudi Arabia, Sudan, Syria, Turkey, Yemen, West Bank, and the Gulf States. Demand projections for the year 2000 AD show virtually all of these states, with the exception of Turkey, running a water deficit (in some cases, there is a slight surplus, but it represents a small fraction of total demand).

Once the available ground water is gone, much of the presently irrigated farm land will become unsuitable or uneconomic for food production. In addition, water consumption by domestic and industrial users will have to be severely curtailed, placing a heavy burden on the economy and quality of life.

Such reductions and curtailments appear inevitable in the relatively near future, unless additional supplies of fresh water become available to the western states. Conservation and efficiency improvements can delay the day of reckoning and soften its impact, but it is still inevitable, given the increasing population and the increasing standard of living.

Substantial improvement in reducing water pollution and the large amounts now wasted in inefficient irrigation practices are possible. Such improvements can substantially increase the amounts of useable water in many regions of the world. However, there will be many locations where it would be highly desirable to transport clean water for long distances, e.g., hundreds of miles, if it can be done at an acceptable cost.

Water can also be transported by conventional pipelines and aqueducts. However, for transport distances of hundreds of miles, such systems are very expensive and difficult. FIG. 1 shows the energy cost for pipeline transmission as a function of pipe diameter. The pressure drop and pumping energy scale as pipe diameter$^{-5}$, i.e., 1/(pipe diameter) to the $5^{th}$ power. As a result of the strong dependence on diameter, for acceptable energy cost, a 300 mile long pipeline system would require a pipe approaching 20 feet in diameter.

Such pipelines are very expensive. Moreover, the total pressure drop of about 1000 psi would require many pumping stations along the 300 mile length. If the maximum P increase that could be handled by the pipeline was approximately 20 psi, on the order of 50 pumping stations, each about 20 feet in diameter would be required, adding additional expense.

Finally, it is likely that any pipeline that traveled hundreds of miles would undergo substantial rises and falls in elevation as it followed the local terrain. If the pipeline elevation were to increase by 20 meters (about 60 feet), an additional 30 psi would have to be injected by a pump. If it were to decrease by approximately 20 meters, approximately 30 psi would have to be removed by a turbo-generator. At a pipe diameter of about 20 feet, the ability to tolerate internal changes in pressure is constrained by stress in the pipe wall. As a result, a water pipeline should travel at near constant elevation, or on a gentle downwards slope (e.g., 1 meter in a kilometer) so that the friction losses compensate for the change in gravitational head.

These problems seriously constrain the capability of large pipelines to carry large quantities of water in rough and hilly terrain. Typically, they either have to be supported on large pier structures like the old Roman aqueducts, or resort to tunnels through hilly or mountainous parts which would be very expensive. A need therefore continues to grow for an effective means for transporting large quantities of clean, fresh water long distances.

Maglev is a new form of transportation in which vehicles are magnetically levitated and propelled at high speeds along a guideway. First generation maglev systems have been developed in Japan and Germany. Implementation of commercial systems is planned between Tokyo and Osaka in Japan, and between Hamburg and Berlin in Germany, shortly after the year 2000.

Vehicles that are levitated magnetically without contacting a support surface encounter reduced friction and vibration problems due to roadbed irregularities. Passenger and freight transport systems utilizing normal permanent magnets or electromagnets have utilized magnetic attraction or repulsion, with the carrier and track held at a set distance through feedback from a gap sensor. One such system, for example, provided for a row of vertical support magnets and another row of lateral guide magnets. Normal motive systems, as well as linear induction motors have also been utilized with such systems for propulsion.

More modern, lighter, more energy efficient electromagnetic inductive levitation and stabilization systems that enable large clearances, typically several inches, have also been proposed for a ground vehicle, utilizing superconducting magnets carried by the vehicle. In one such system, the superconducting magnets interacted with a plurality of arrays of longitudinally extending shorted loops of a non-magnetic metal conductor, such as aluminum, in a guideway. The vehicle was suspended over the guideway by magnetic interaction of the superconducting magnets with the shorted loops in the guideway. The vehicle was supported on wheels when at rest, or when it was started, or operated at transitional speeds below that necessary to suspend the vehicle. Vertical lift was provided by magnetic interaction of the superconducting magnets with coils in the form of individual shorted loops. Horizontal stability was provided by magnetic interaction of the superconducting magnets with coils arranged in a figure 8 shape or in the form of a longitudinally extending series of two vertically spaced, electrically separated loops. The train was propelled by a linear synchronous motor (LSM), in which thrust was obtained by providing AC current to propulsion windings on the ground, which magnetically interacted with, and pushed forward the superconducting magnets located on the car of the train.

Maglev technology has major advantages for the transport of passengers and freight, in that it offers: much lower operating cost and less energy consumption than conventional transport; high speed, weather independent service; convenient, rapid access to nearby stations; efficient intermodal transfer; extremely long service life for vehicles and guideways; and exceptional safety. Because magnetic levitation can provide for efficient and rapid long distance transportation, it would be desirable to provide a maglev transport system to carry large amounts of water, i.e., on the order of 1 billion gallons daily (i.e., 1,000 megagallons per day), for hundreds of miles. The present invention meets these and other needs.

SUMMARY OF THE INVENTION

With certain modifications to conventional maglev vehicle designs and maglev guideway designs, it appears possible for second generation maglev systems to greatly reduce construction costs of guideways and enable carrying freight at very low cost, to permit the transport of water at less than 0.1 cents per ton mile. An important point in minimizing cost is that the propulsive power and LSM windings will occur only on a small portion of the guideway because the very low drag losses enable the train to travel for many miles without a significant reduction in speed. This helps to reduce guideway cost.

Long distance water transport by maglev appears to be an economically viable option for western U.S. states where water consumption is placing high stress on the renewable water supply. In most cases, the cost of water transport, while low, will still exceed current water costs; however, such transport is preferable to incurring the serious and irremediable environmental degradation—i.e., water table decline, land settling and crevassing, salt buildup, drying up of rivers and lakes, etc.—now taking place.

Briefly, and in general terms, the invention accordingly provides for a magnetic levitation system for long distance delivery of water includes a magnetic levitation guideway and a magnetic levitation train of vehicles for carrying large amounts of water at high speed. Vehicles of the water train have a large, flexible balloon having a thick skin formed of reinforced flexible composite material for carrying water. When pressurized and filled with water, the container forms a streamlined cylinder that runs the full length of the vehicle. After delivery of the water load and depressurization, the flexible skins are depressurized and collapsed to minimize the frontal area and air drag on the vehicles. An "iron lift" guideway panel provides the magnetic lift force, with superconducting magnets on the vehicle attracted upwards to laminated steel plates attached to the guideway. Null flux aluminum loops provided for inherent stabilization. Unstable horizontal attractive forces are countered by null flux stability loop circuits making the stable restoring force from the null flux loops greater than the unstable force from the attraction to the steel plates, so that the net horizontal force is restoring, and the suspension is horizontally stable.

At a projected delivered cost of approximately one dollar per thousand gallons, there would be many regions willing to buy transported water. A thousand gallons of water weights 3.8 tons. For a transport distance of 300 miles, with the water free at the sources, the transport cost for a delivery price of one dollar per thousand gallons is 0.09 cents per ton mile. Such a cost is much lower than the cost of bulk freight transport by railroad, which is approximately 3 cents per ton mile—a factor of 30 greater.

Such a transport network could carry water trains or the major part of their travel route in appropriate segments of the network. Additional, shorter guideway route segments would probably be necessary for final delivery of the transported water, but the major portion of the guideway cost could then be borne by the passenger—truck traffic, which would produce much higher revenues and pay for the guideway.

In addition, water delivery would not necessarily be required to the actual final use point. For example, water carried from the Eastern sources need only be transported to the upper reaches of he Colorado River Basin across the Continental Divide, where it would flow to Arizona, California, and Nevada, saving hundreds of miles in transport distance.

In summary, maglev water transport appears to be a very attractive, technically practical, economical way to transport large amounts of water for long distances, i.e., hundreds of miles, which are not technically or economically practical using conventional pipelines or aqueducts. There are many locations in the world where water demand exceeds supply. Such locations could obtain water by maglev transport.

The vehicles use an "iron lift" guideway panel to provide the magnetic lift force, with null flux aluminum loops for inherent stabilization. The $I^2R$ losses (i.e., the "magnetic drag") in the aluminum loops is negligible in comparison to air drag, since only small currents are required for stability and to compensate for irregularities in the guideway. Suspension clearances between the vehicles and the guideway are on the order of about 6 inches. Air drag losses are relatively small. Compared to using single vehicles, the air drag resistance per vehicle for the multi unit train is approximately 25% of a single vehicle, because of the reduction in form drag. Most of the drag losses for the multi unit train are caused by skin friction, rather than form drag. In single vehicles, most of the drag losses are caused by form drag.

The maglev water train would move heavy vehicles containing water (about 200 tons per 30 meter long vehicle) at high speeds of about 100 meters per second (225 mph) in long unit trains (total length of 1 kilometer or more). Transport distances of 300 miles, and even greater— probably up to 1000 miles appear practical.

Because of the train's great kinetic energy and low air drag losses, it can coast for hundreds of miles without much loss in speed. As a result, the distance between propulsion power windings can be very large—a hundred miles or more. In fact, if there is a modest drop in elevation over the length of the guideway of a 0.1% grade (1 meter per kilometer, or 5 feet per mile) no propulsive power is required at all, since gravitational energy will compensate for air drag losses. Moreover, if the grade is steeper than 0.1%, the train can generate a net surplus of electric power. Once put into motion, the water train can easily flow rises and falls in elevation, changing speed slightly as the elevation changes, without any propulsion power input.

These and other aspects and advantages of the invention will become apparent from the following detailed descrip-

DETAILED DESCRIPTION OF THE PREFERRED EMBODIMENTS

The availability of ample clean water is a major present concern in many regions of the world, and is expected to become an ever greater problem in the decades ahead—in fact, many experts believe it to be the number one problem facing the world. Water can be transported by conventional pipelines and aqueducts. However, for transporting large quantities of water distances of hundreds of miles, such systems are very expensive and difficult. Maglev technology offers advantages for the transport of large amounts of water for hundreds of miles.

Figure 1:
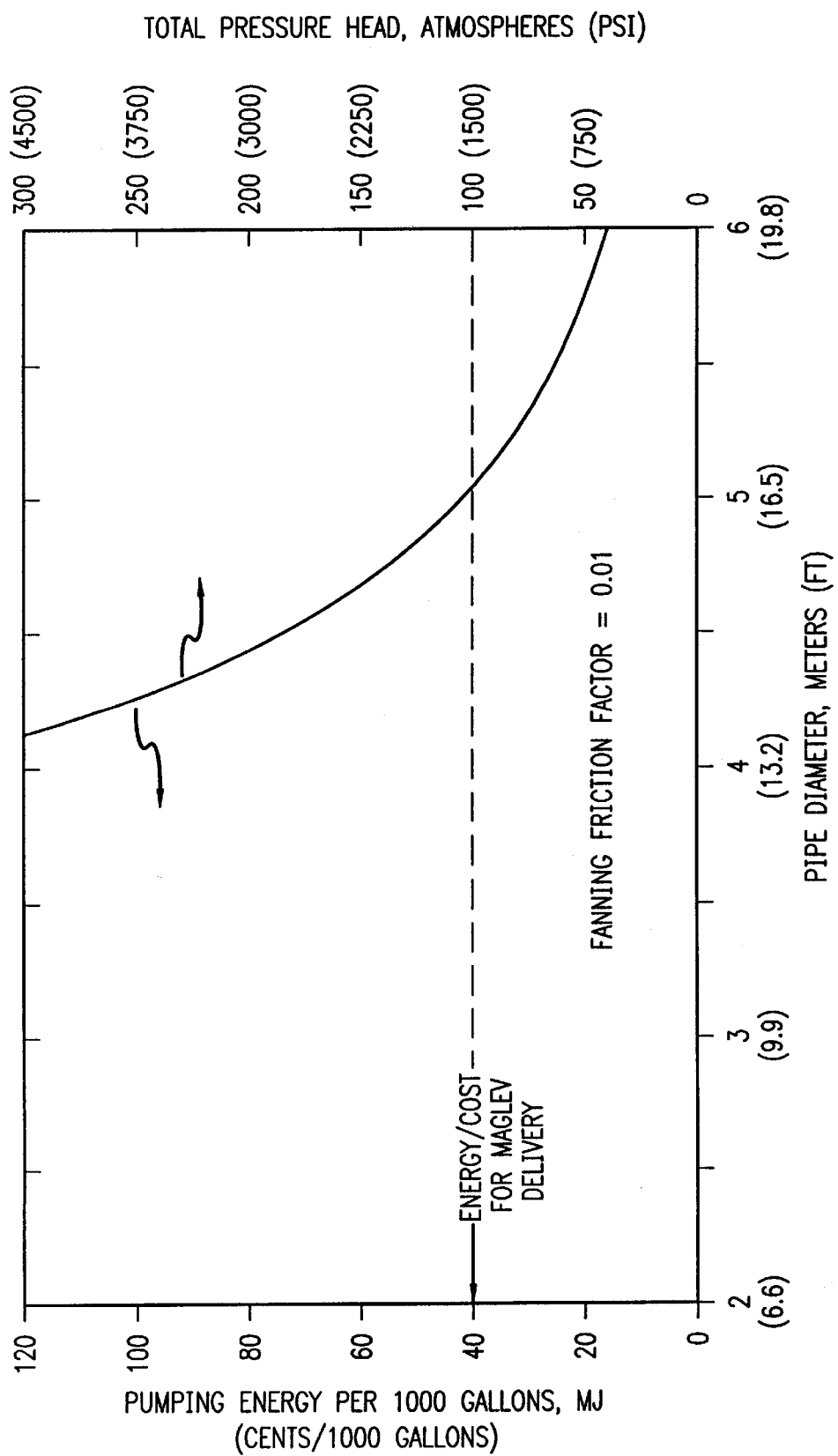
FIG. 1 is a graph illustrating the pumping energy and pressure head to deliver 1,000 mega gallons of water daily as a function of pipe diameter.
Figure 2:
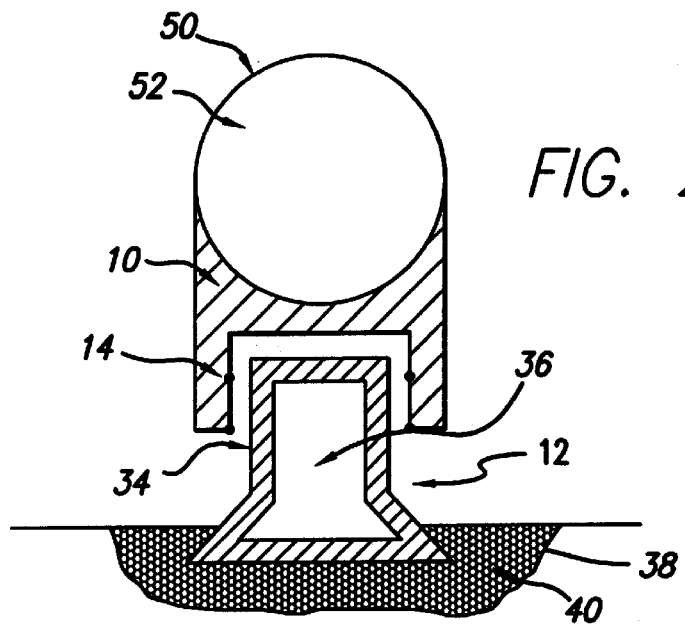
FIG. 2 is a schematic transverse cross-sectional diagram of a magnetic levitation guideway and magnetic levitation train of vehicles for carrying large amounts of water at speed.

As is illustrated in the drawings, which are provided by way of illustration and not by way of limitation, the invention is accordingly embodied in a magnetic levitation system for long distance delivery of water, including a water transport magnetic levitation vehicle 10 that can be implemented as a train, and a magnetic levitation guideway 12 for the vehicle, as shown in FIG. 2.

Figure 3A:
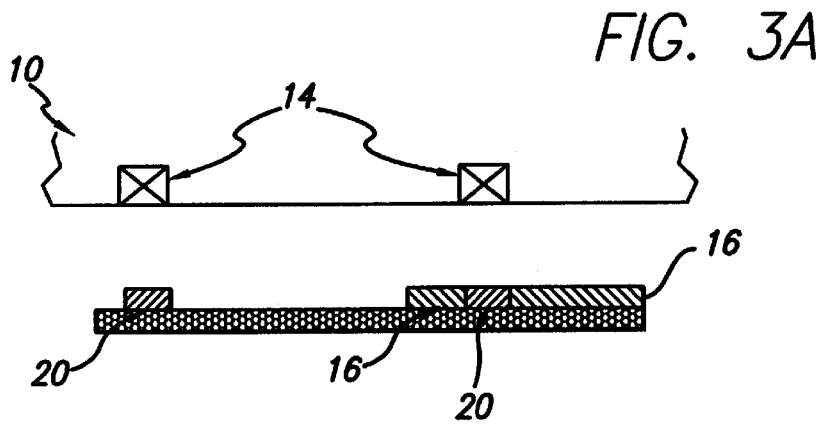
FIG. 3A is a schematic transverse cross-sectional diagram of the superconductor vehicle magnets and the guideway panel structure.
Figure 3B:
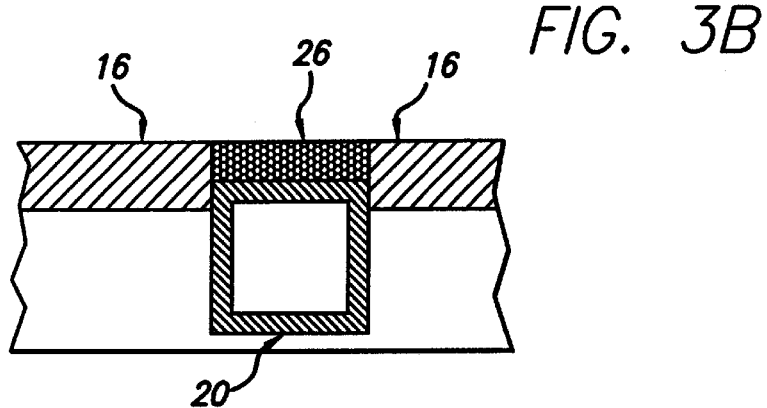
FIG. 3B is an enlarged view of a section of the guideway panel structure of FIG. 3A.
Figure 3C:
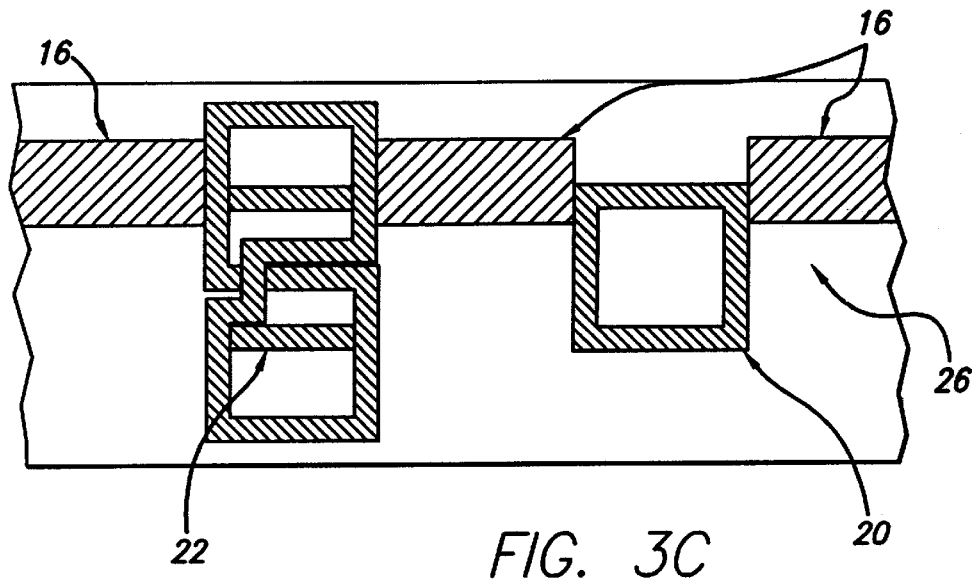
FIG. 3C is a schematic diagram of optional Figure of 8 vertical stability null flux loops that can provide additional vertical stabilizing force.

The much heavier loading anticipated for a maglev water train requires that the maglev guideway be continuously supported along its length, or if it utilizes discrete supports, that they be relatively close together (i.e., every 20 feet or so). The design shown in FIGS. 2 and 3A to 3E fulfills this requirement. It uses the "iron lift" configuration in which superconducting magnets 14 on the vehicle are attracted upwards to laminated steel plates 16 attached to the guideway as shown in FIGS. 3A to 3C. The suspension is designed so there is a vertical equilibrium point at which the vertical lift force from the steel plates equals the weight of the vehicle.

The "iron lift" configuration shown in FIGS. 2 and 3A to 3E is vertically stable, since as the vehicle moves upwards, the lift force becomes smaller, and as it moves downwards, the lift force becomes larger. The "iron lift" configuration is horizontally unstable. If the vehicle is centered on the guideway, the horizontal force from the left steel plate equals and balances the horizontal force from the right steel plate with the result that the net horizontal force on the vehicle is zero.

If the vehicle moves slightly horizontally off center, however, a net attractive horizontal force towards the guideway develops. If not countered, the vehicle will continue to move towards the guideway, further increasing the attractive force. This unstable attractive force is countered by the null flux stability loop circuit 20 shown in FIGS. 3A to 3E. By making the stable restoring force from the null flux loops greater than the unstable force from the attraction to the steel plates, the net horizontal force is restoring, and the suspension is horizontally stable.

The guideway panels 26 shown in FIGS. 3A and 3B are plastic sheets on which are mounted the laminated steel plates that provide the iron lift force, together with null flux connected dipole loops that provide lateral stability. The guideway panels can typically be molded plastic, polymer, concrete, or other moldable material. Also shown in FIG. 3C are optional Figure of 8 vertical stability null flux loops 22 that provide additional vertical stabilizing force, if desired.

Figures 3D, 3E:
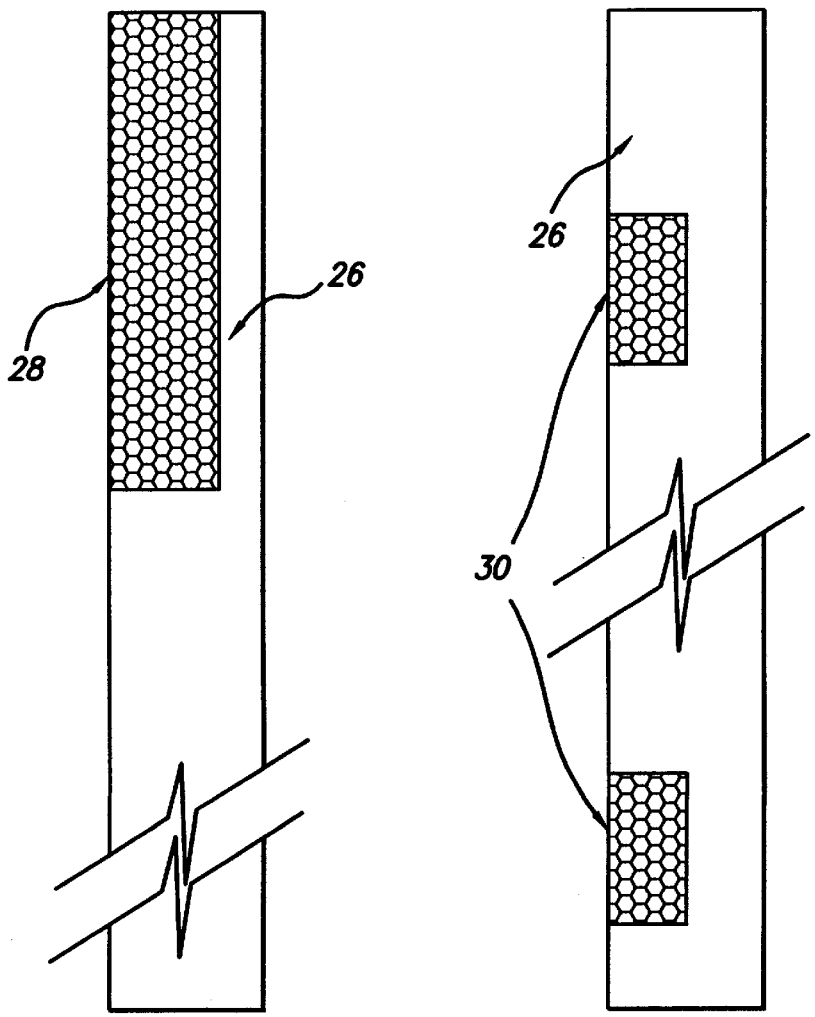
FIG. 3D is a cross-sectional view through the guideway panel showing imbedded steel wires or particles to provide vertical lift.
FIG. 3E is a cross-sectional view through the guideway panel showing aluminum null flux conductors.

The amounts of steel and aluminum for the guideway are small, both in terms of mass per unit length and of cost. As is illustrated in FIGS. 3D and 3E, the steel wires, plate or particles 28 for providing lift and the aluminum wires 30 of null flux lateral stability loops can be attached as separate discrete sheets 28 and loops 30 to the panel, or imbedded inside it for greater strength and lower cost. The aluminum conductor for the null flux loops on the guideway (single direction) will weigh about 30 kg per meter and cost about $400,000 per mile (2 way guideway) at $2 per pound. A steel plate also weighs approximately 30 kg per meter (single direction) and costs $200,000 per mile (2 way guideway) at $1 per pound.

The major guideway cost component is the beam 32 on which the guideway panels are attached, as shown in FIG. 2. This would be designed as a relatively lightweight form which can be provided as an outer shell 34, a precast beam or concrete filled form, and provided with a foam core 36, such as polyurethane or polystyrene for example, and with its attached panels, would be placed onto an excavated footing 38 and filled with concrete 40 to form a strong, rigid, and heavy structure on which the maglev vehicles rode.

An important point in minimizing cost is that the propulsive power and LSM windings will occur only on a small portion of the guideway because the very low drag losses enable the train to travel for many miles without a significant reduction in speed. This helps to reduce guideway cost.

For low drag force, it is important to minimize the air drag resistance on the vehicles. On this connection, it is very desirable to operate long trains of multiple water vehicles rather than single vehicles, since the air drag resistance per vehicle will be must less, as illustrated in Table 3. The total drag on a 30 meter long 3 meter diameter vehicle at 300 mph is 17,300 newtons. The total drag on a 0.1 kilometer long train, (i.e., 33 vehicles) is substantially greater, 138,400 newtons; however, the equivalent drag per vehicle of the multi-train is only 24% of a single vehicle.

The horizontal stability null flux loops are assumed to occupy 50% of the guideway length, with the remaining 50% occupied by the steel lift plates. This coverage fraction may change somewhat for more detailed designs, but is a reasonable preliminary estimate. The superconducting magnets are well within the state of the art;

in fact, the 800 KA loop current is comparable to the 700 KA loop current used in the Japanese maglev vehicle magnets.

Referring to FIG. 2, an important feature of the water train is the flexible "balloon" 50 that carries the water 52 on each vehicle. The term "balloon" is somewhat misleading, in that its wall is not a thin highly stressed material that could be easily ruptured. Instead, the "skin" is a relatively thick, e.g., one inch, reinforced flexible composite material. When pressurized and filled with water, the container forms a streamlined cylinder that runs the full length of the vehicle. After delivery of the water load and depressurization, the flexible skins depressurized and collapsed minimizing the frontal area and air drag on the vehicle. The air drag resistance for a long multi-vehicle train will be much smaller than for a single vehicle.

The air drag resistance on the train is then given by $$F_D = 1/2 C_D^* \rho_{air} V^2 A_F \text{ Newtons} \quad (1)$$

where $C_D^*$=Drag coefficient for multi unit train, based on frontal area [1=1.76 for 1 km long train]

$\rho_{air}$=Density of air, 1.29 kg/m$^3$

V=Train speed, m/sec.

$A_F$=Projected Frontal Area, m$^2$

For the configuration shown in FIG. 2, the projected frontal area includes the balloon, the vehicle support structure, and its magnet arms. The total frontal area is 10.3 m$^2$.

When the balloon is deflated for the vehicle's return trip, the total frontal area is smaller, about 3.2 m2. Since the frontal area is less during the return trip, the total energy expended for the vehicle's complete round trip (i.e., outbound with water and return empty) can be minimized by operating the vehicle at a somewhat slower speed than average during the outbound trip and a somewhat higher speed than the average during the return trip. Typically, outbound trip speed is about 80 to 90% of the average speed, while the return trip is about 110 to 120% of average speed.

Figure 4:
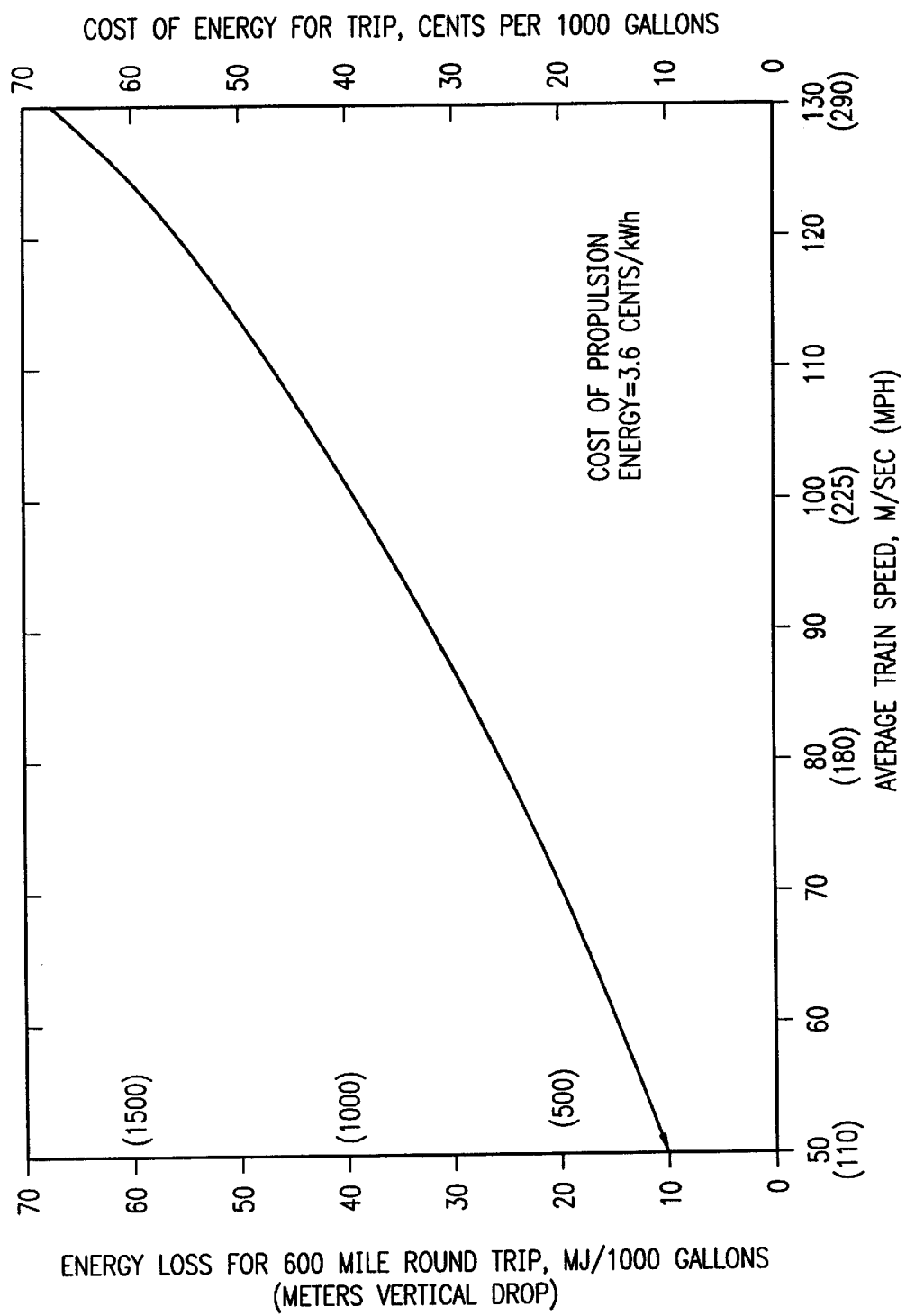
FIG. 4 is a graph illustrating air drag energy losses versus average train speed.

FIG. 4 shows the air drag energy loss for a 300 mile delivery trip (600 miles round trip) as a function of the average speed of the delivering vehicles. At a nominal average speed of 100 meters per second (225 mph), air drag losses are 40 megajoules (MJ) per 1000 gallons of water for a 500 kilometer (300 mile) trip. At a price of 3.6 cents per KWH [1 KWH=3.6 MJ], the energy cost is then 40 cents per 1000 gallons. This cost includes both the outbound and return trips. It does not include additional energy losses due to hysteresis losses in the laminated steel plates and I$^2$R losses in the horizontal stability coils. In general, however, these will be small, a few percent of the air losses, because the hysteresis effects are very small and the time averaged restoring forces are minor compared to the weight of the vehicle.

Figure 5:
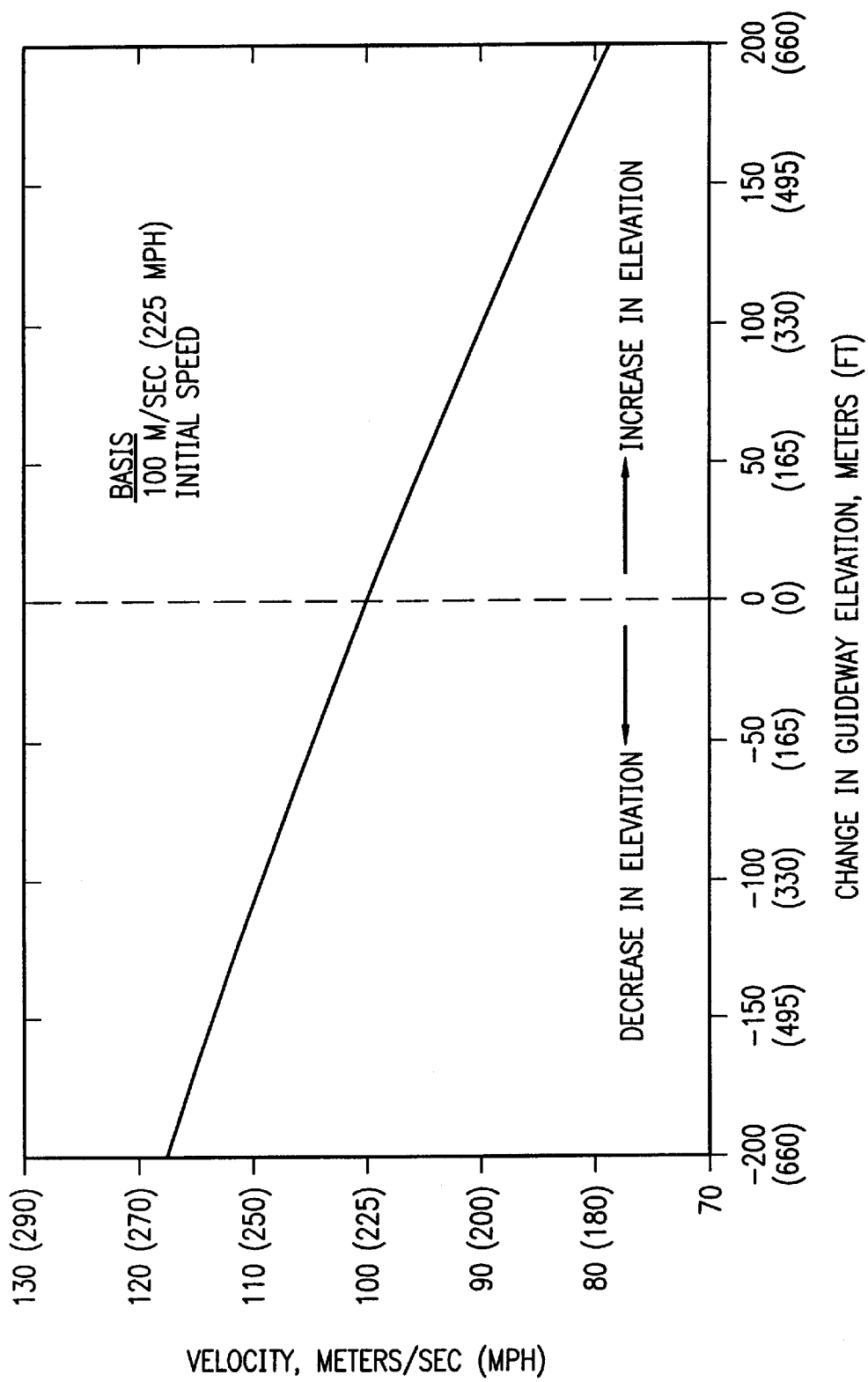
FIG. 5 is a graph illustrating maglev speed as a function of change in guideway elevation for a maglev vehicle receiving no propulsive thrust.

A maglev water transport system does not have this problem. Elevation changes in terrain are easily accommodated by small changes in train speed. FIG. 5 shows the velocity change for a 100 meter/sec (225) mph water train as a function of elevation change. Even for changes of ±200 meters (660 feet), the velocity changes are modest and acceptable, without the need for propulsive power. The water train would simply speed up or slow down slightly, depending on the local terrain.

Figure 6:
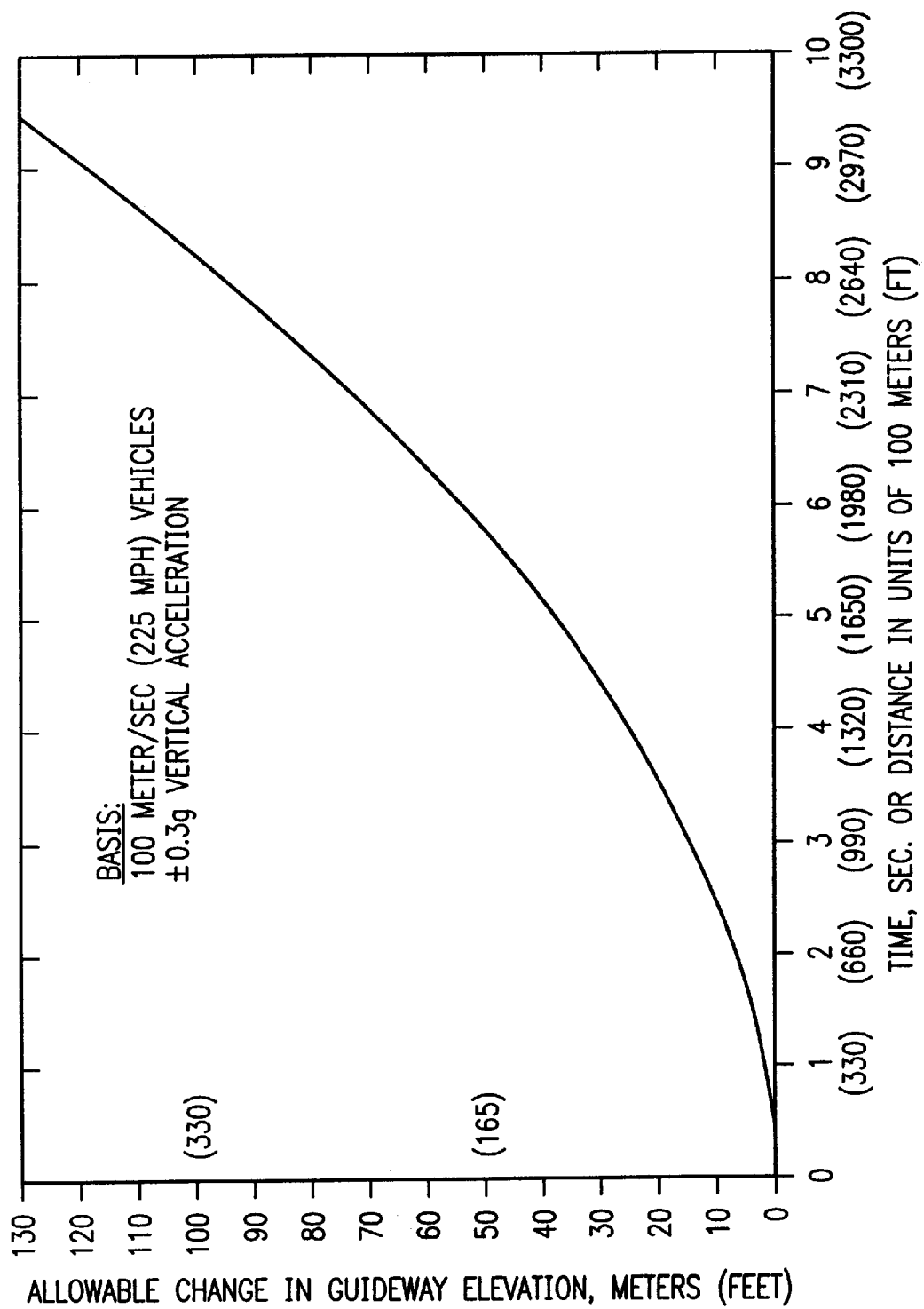
FIG. 6 is a graph illustrating allowable changes in guideway elevation as a function of time/distance traveled along a route.

Moreover, the vertical acceleration effects on the maglev vehicles due to changes in elevation also appear acceptable. The unmanned vehicle can undergo considerably greater vertical accelerations than would be acceptable from the standpoint of passenger comfort. FIG. 6 shows the change in guideway elevation (either upwards or downwards) as a function of time and distance resulting from a ±0.3 g vertical acceleration on a maglev vehicle traveling at 100 meters per second (225 mph). The changes in elevation over a nominal distance of one kilometer can be quite large, i.e., ±150 meters. The guideway and vehicles can readily accommodate ±0.3 g, and probably even greater vertical acceleration.

Accordingly, the maglev guideway can follow hilly terrain far better than railroads can. There may be local spots where bridges or throughcuts are required when the terrain changes elevation abruptly, but these should comprise only a small fraction of the route.

Figure 7:
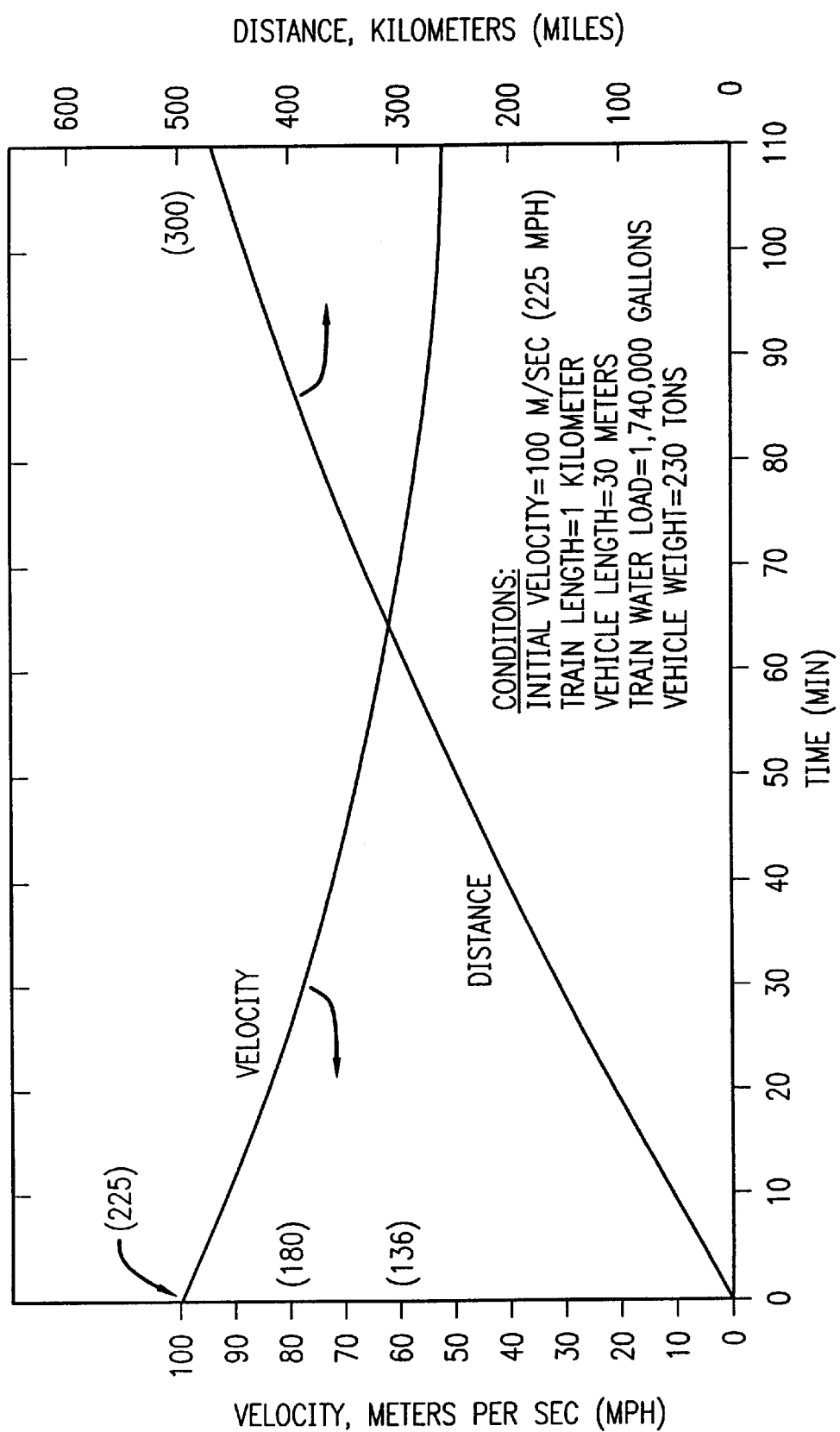
FIG. 7 is a graph illustrating distance and velocity as a function of time for a maglev water carrier with zero propulsive power.

Finally, in contrast to long distance pipelines, which require many pumping stations along their length, the water train, because of its high kinetic energy and low air drag, can coast for hundreds of miles without additional propulsion. FIG. 7 shows the velocity and distance covered as a function of time after the water train attains an initial velocity of 100 m/sec (225 mph). At a distance of 100 miles, water train velocity has dropped to 80% of the initial value, with the average velocity over the 100 mile segment at about 90% of initial speed. While the water train could coast the entire 300 miles without propulsive input, it probably would be desirable to re-accelerate at intervals of 100 to 150 miles in order to keep the average velocity close to the optimum for minimizing cost.

At the destination, the water train would be electromagnetically de-accelerated down to zero velocity, and its kinetic energy fed back as electric power into the grid.

Figure 8:
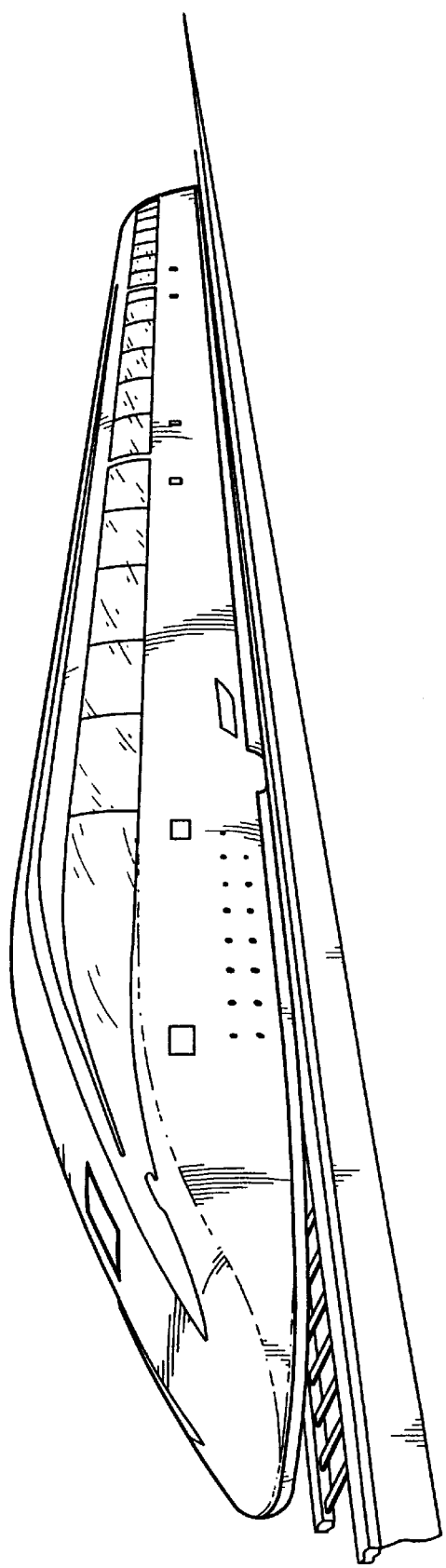
FIG. 8 is a perspective view of a full scale, 3 vehicle maglev passenger train.

FIG. 8 shows a full scale, 3 vehicle maglev passenger train. The Maglev System, magnetically levitates and propels vehicles 6 inches above the U shaped guideway (11). Superconducting magnets on the moving vehicles induce currents in a sequence of normal metal loops placed along the guideway. The magnetic repulsion between the superconducting vehicle magnets and the currents in the normal ambient temperature aluminum loops automatically levitates the vehicle 6 inches above the guideway. The vehicle is inherently and passively stable about its equilibrium suspension point. If an internal force acts on the vehicle (e.g., wind, guideway irregularity, up or downgrade, curve, etc.) a magnetic restoring force automatically acts so as to push the vehicle back towards its equilibrium suspension point.

The magnetic restoring forces counteract all external forces or moments, whether they act horizontally, vertically, or in the pitch, yaw, or roll directions. The restoring forces, which are linear with displacement from equilibrium, can be designed to be very strong, that is, it moves vertically frictionlessly along the guideway except for air drag and a small magnetic drag due to I$^2$R losses in the guideway loops.

A separate small AC current winding in the guideway propels the vehicles by magnetic interaction with their superconducting loops. This LSM (Linear Synchronous Motor) propulsion system is exceptionally efficient and very safe. Vehicles automatically maintain a constant spacing between them, regardless of whatever variations in force (e.g., head winds, tail winds, up and down grades) act on the individual vehicles.

The water train concept is economically and technically practical with today's technology for transport distances of hundreds of miles. With the technology improvements that can be anticipated in the next few years, it will become even more attractive, and capable of transport over even longer distances. For example, the technology of high temperature superconductors (HTS) capable of operating with liquid nitrogen refrigeration, rather than liquid helium, is advancing rapidly. Current HTS superconductors have almost enough current density capability to be useful for the water train. In the next few years, it appears very likely that current density will improve sufficiently that HTS superconductors can be used for the water train, greatly simplifying cryogenic design and cost.

Water trains appear attractive for easing water shortages in many regions of the world. To be practically applied, however, the water train must satisfy four criteria:

1. The water train meets the water needs in the proposed region.
2. The country of application is technologically capable of building, operating, and maintaining maglev systems.
3. The proposed water train system is affordable and economically practical.
4. Implementation is politically possible as maglev transport systems are built and operated in various regions of the world, and as developing countries become more industrialized, there will be many more nations with the necessary technological and GNP capability to implement water trains.

Such a transport network could carry water trains or the major part of their travel route in appropriate segments of the network. Additional, shorter guideway route segments would probably be necessary for final delivery of the transported water, but the major portion of the guideway cost could then be borne by the passenger—truck traffic, which would produce much higher revenues and pay for the guideway.

In addition, water delivery would not necessarily be required to the actual final use point. For example, water carried from the Eastern sources need only be transported to the upper reaches of he Colorado River Basin across the Continental Divide, where it would flow to Arizona, California, and Nevada, saving hundreds of miles in transport distance.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A magnetic levitation system for long distance delivery of water, comprising:

a vehicle having magnets for providing magnetic levitation of said vehicle;

an electromagnetic induction levitation guideway providing magnetic levitation for said vehicle, said guideway including a guideway panel bearing steel members to which said magnets of said vehicle are attracted to provide vertical lift to said vehicle, said vehicle adapted to travel in a longitudinal direction along said guideway; and a flexible container mounted to said vehicle, said flexible container adapted to be inflated with water for transport and delivery of water by said vehicle.

2. The magnetic levitation system of claim 1, wherein said guideway panel includes lateral stability means for laterally stabilizing said vehicle with respect to said guideway.

3. The magnetic levitation system of claim 2, wherein said lateral stability means comprises a null flux lateral stability loop circuit.

4. The magnetic levitation system of claim 1, wherein said flexible container is formed of a reinforced flexible composite material.

5. The magnetic levitation system of claim 1, wherein said flexible container is adapted to be filled with water and pressurized to assume a given configuration when filled and pressurized, and assumes a configuration with a lower frontal area and cross section when emptied.

6. The magnetic levitation system of claim 1, wherein said guideway extends vertically and longitudinally, said guideway comprises a pair of guideway panels disposed vertically on lateral, vertically extending longitudinal sides of said guideway, each of said guideway panels bearing said steel member, and wherein said magnets of said vehicle are disposed laterally adjacent to said steel members of said guideway panels, whereby said steel members provide vertical lift to said vehicle.

* * * * *

UNITED STATES PATENT AND TRADEMARK OFFICE
CERTIFICATE OF CORRECTION

PATENT NO. : 6,152,045
DATED : November 28, 2000
INVENTOR(S) : James R. Powell, Gordon T. Danby It is certified that error appears in the above-identified patent and that said Letters Patent is hereby corrected as shown below:

Column 7,
Lines 28 & 34, change "pair", to read -- p air --, both occurrences.

Signed and Sealed this

Second Day of October, 2001

Attest:

NICHOLAS P. GODICI
*Attesting Officer*   *Acting Director of the United States Patent and Trademark Office*